(12) United States Patent
Wenger et al.

(10) Patent No.: US 11,865,487 B2
(45) Date of Patent: Jan. 9, 2024

(54) SWITCHABLE FILTRATION SYSTEM

(71) Applicant: TRANE INTERNATIONAL INC., Davidson, NC (US)

(72) Inventors: Scott Wenger, Mooresville, NC (US); Anthony W. Bruno, Blaine, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 421 days.

(21) Appl. No.: 17/136,923

(22) Filed: Dec. 29, 2020

(65) Prior Publication Data

US 2022/0203287 A1 Jun. 30, 2022

(51) Int. Cl.
| | | |
|---|---|---|
| *B01D 46/46* | (2006.01) | |
| *F24F 8/108* | (2021.01) | |
| *B01D 46/56* | (2022.01) | |
| *B01D 46/10* | (2006.01) | |
| *B01D 46/42* | (2006.01) | |
| *B01D 46/44* | (2006.01) | |

(52) U.S. Cl.
CPC ............ *B01D 46/46* (2013.01); *B01D 46/10* (2013.01); *B01D 46/4227* (2013.01); *B01D 46/442* (2013.01); *B01D 46/56* (2022.01); *F24F 8/108* (2021.01); *B01D 2267/40* (2013.01); *B01D 2273/14* (2013.01); *B01D 2273/16* (2013.01); *B01D 2279/50* (2013.01)

(58) Field of Classification Search
CPC ........ B01D 46/46; B01D 46/56; B01D 46/10; F24F 8/108; F24F 3/16; F24F 11/39; F24F 2110/50
See application file for complete search history.

(56) References Cited

U.S. PATENT DOCUMENTS

| | | | | |
|---|---|---|---|---|
| 2013/0178987 A1* | 7/2013 | Meirav | .................. | G05B 15/02 |
| | | | | 700/276 |
| 2016/0271550 A1* | 9/2016 | Law | ...................... | F24F 1/0071 |
| 2017/0082305 A1* | 3/2017 | Law | ........................ | A61L 9/205 |
| 2019/0346161 A1* | 11/2019 | Meirav | .................. | F24F 7/003 |
| 2020/0182495 A1* | 6/2020 | Park | ........................ | F24F 11/39 |
| 2022/0203288 A1* | 6/2022 | Wenger | .............. | B01D 46/0036 |

FOREIGN PATENT DOCUMENTS

| | | | |
|---|---|---|---|
| CN | 209341432 U | | 9/2019 |
| EP | 3121524 A1 | | 1/2017 |
| EP | 3623714 A1 | | 3/2020 |
| JP | 2000262826 A | * | 9/2000 |
| KR | 20220138880 A | * | 10/2022 |

OTHER PUBLICATIONS

Extended European Search Report dated May 30, 2022, European Patent Application No. 21218112.7 (7 pages).

* cited by examiner

*Primary Examiner* — Robert Clemente
(74) *Attorney, Agent, or Firm* — Hamre, Schumann, Mueller & Larson, P.C.

(57) ABSTRACT

A switchable filtration system for a heating, ventilation, air conditioning, and refrigeration (HVACR) system is disclosed. The filtration system includes a first filter, a second filter, a switching apparatus, and a controller. The controller is configured to determine an air quality score. When the air quality score exceeds a predetermined threshold, the controller controls the switching apparatus to switch the first filter out of an active airflow path. When the air quality score is at or below the predetermined threshold, the controller controls the switching apparatus to switch the first filter into the active airflow path.

20 Claims, 11 Drawing Sheets

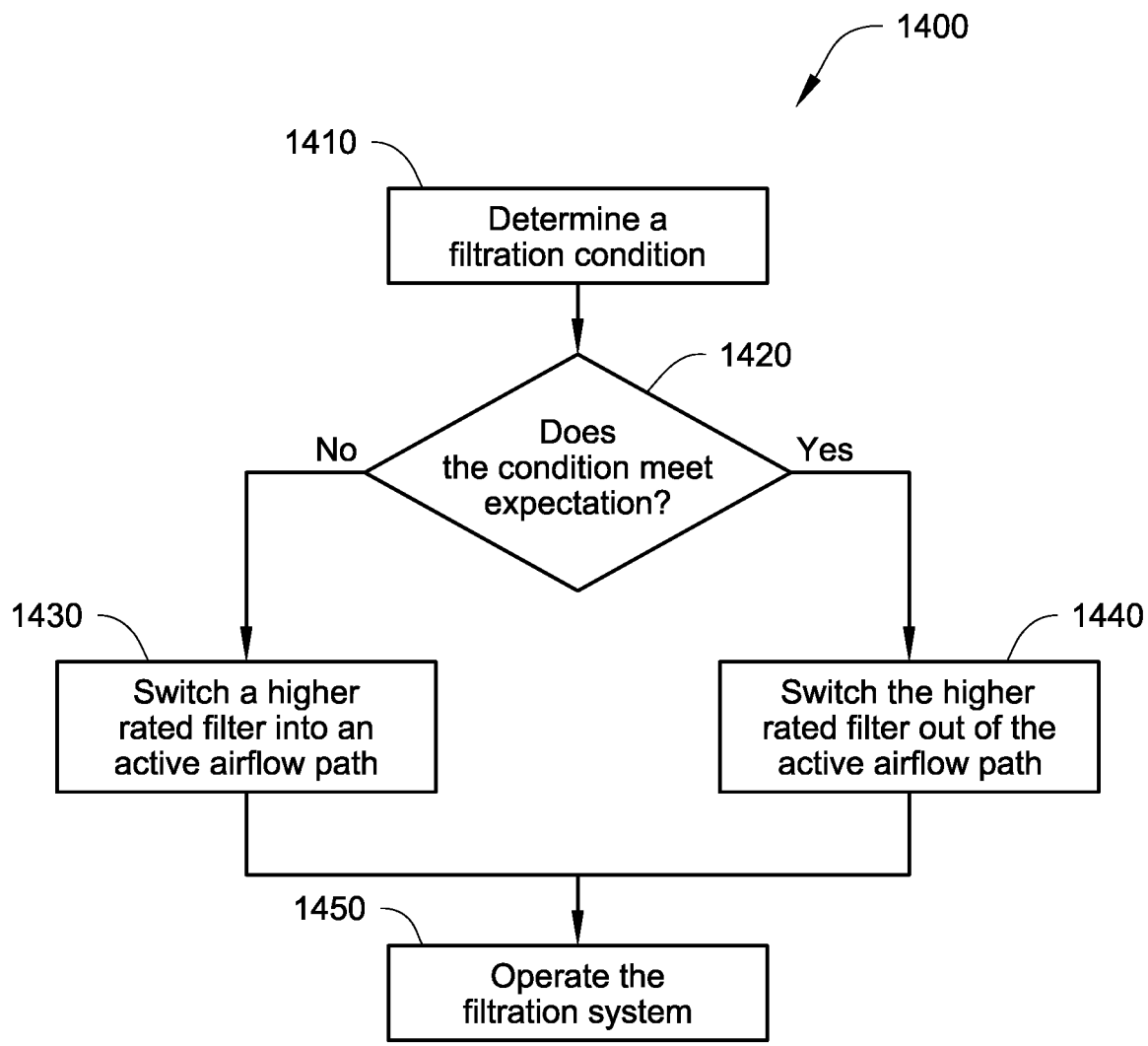

SWITCHABLE FILTRATION SYSTEM

FIELD

This disclosure relates generally to a switchable filtration system for a heating, ventilation, air conditioning, and refrigeration (HVACR) system. More specifically, the disclosure relates to systems and methods for switching filter(s) into and/or out of an active airflow path for an HVACR system based on a determined air quality score.

BACKGROUND

An HVACR system may include a rooftop unit to provide conditioned air to an air distribution system that includes ductwork. In HVACR systems, conditioned air is delivered to a building or occupied space. Air handlers or the air handler sections of an air conditioning unit for meeting the HVACR needs of a building often include a heat transfer circuit system housed within a sheet metal enclosure. The heat transfer circuit may include one or more compressors, a condenser, an evaporator, fans, filters, dampers, and various other equipment. The compressor(s), the condenser, the expansion device, and the evaporator are fluidly connected.

SUMMARY

Building owners and operators (commercial, industrial, and residential) have the ability to control conditioned air movement, temperature, humidity and air cleaning technologies within their building.

The requirements for air filtration systems may vary widely. In some applications (commercial, residential, transport, etc.), it may be advantageous to use higher rated filters to contain contaminants including particulate matter, etc. While a higher rated filter may perform better for filtration than a lower rated version, the performance may come at a cost, both in terms of purchase cost and energy consumption. Additionally, higher rated filter life may be shortened due to continuous use when the benefits of its filtration performance cannot be observed or are otherwise unnecessary. Generally, users have a choice to replace one filter with a different one, but may not have the option for using a higher rated filter only when it is beneficial to do so based on an air quality score such as air quality, occupancy, or other requirements in the conditioned space.

Embodiments disclosed herein provide a selectable or switchable air filter system that uses air quality, occupancy, and/or any other suitable air quality score to decide the required level of filtration, and control airflow across one installed filter versus another filter. Embodiments disclosed herein may reduce the energy intensity of an HVACR system by reducing the amount of time when high pressure drop filters are used in an airflow. Embodiments disclosed herein may also increase the overall life of highly rated, often expensive filters and allow for more time between filter exchanges. Embodiments disclosed herein may further enable uninterrupted air filtration during equipment operation by enabling "hot swap" filter changes.

A switchable filtration system for an HVACR system is disclosed. The filtration system includes a first filter, a second filter, a switching apparatus, and a controller. The controller is configured to determine an air quality score. When the air quality score exceeds a predetermined threshold, the controller controls the switching apparatus to switch the first filter out of an active airflow path.

A method for switching filters in a filtration system for an HVACR system is disclosed. The filtration system includes a first filter, a second filter, a switching apparatus, and a controller. The method includes determining, by the controller, an air quality score. The method also includes when the air quality score exceeds a predetermined threshold, controlling the switching apparatus to switch the first filter out of an active airflow path. The first filter has a higher pressure drop, or has a higher efficiency, and/or is rated higher than the second filter.

BRIEF DESCRIPTION OF THE DRAWINGS

References are made to the accompanying drawings that form a part of this disclosure and which illustrate the embodiments in which systems and methods described in this specification can be practiced.

FIG. 14 illustrates a flowchart of a method for switching filters in a filtration system, according to an embodiment.

Like reference numbers represent like parts throughout.

DETAILED DESCRIPTION

Figure 1:
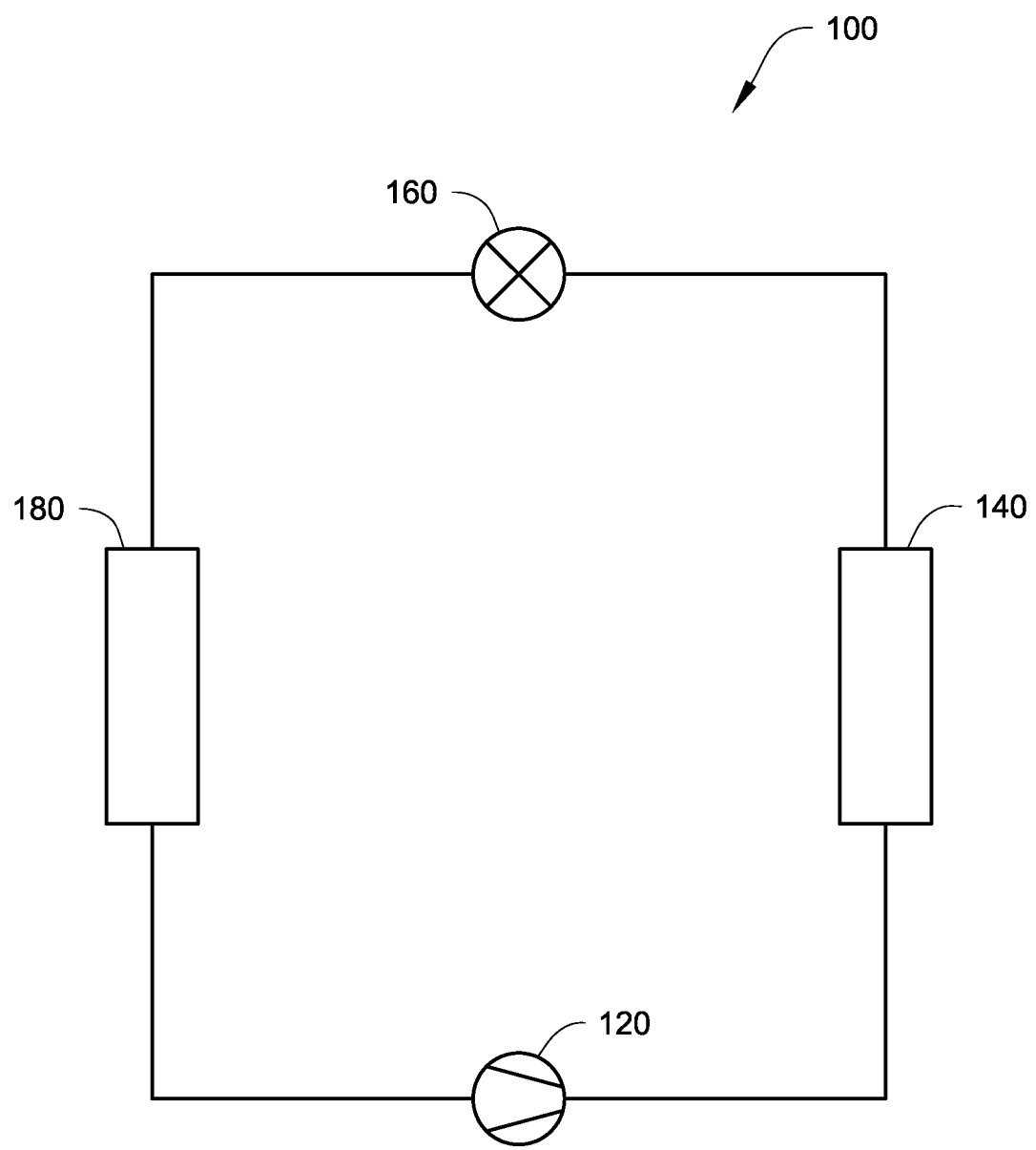
FIG. 1 illustrates a schematic diagram of a refrigeration circuit, which may be implemented in an HVACR system, according to an embodiment.

The following definitions are applicable throughout this disclosure. As defined herein, the term "air handler" or "air handling unit" may refer to a device used to regulate and circulate air as part of an HVACR system. In an embodiment, an air handler may be a large metal box containing a blower, heating or cooling elements, filter racks or chambers, sound attenuators, and/or dampers. Air handler typically connect to a ductwork ventilation system that distributes the conditioned air through the building and returns it to the air handler. In an embodiment, the air handler may discharge (or supply) and admit (or return) air directly to and from the space served without ductwork.

As defined herein, the term "air filter" or "filter" may refer to a device including fibrous and/or porous materials which can remove solid particulates such as dust, pollen, mold, and/or bacteria, etc. from the air. Filters may use foam, pleated paper, cotton, and/or spun fiberglass materials and/or materials with a static electric charge, which attract dust particles. Filters containing an adsorbent or catalyst such as charcoal (carbon) may also remove odors and gaseous pollutants such as volatile organic compounds or ozone. Filters are typically used in applications where air quality is important, such as in building ventilation systems and/or in engines.

As defined herein, the term "filtration" may refer to a physical, biological, or chemical operation that separates solid matter and fluid from a mixture with a filter medium that has a structure through which only the fluid may pass.

As defined herein, the term "rated" or "rating" may refer to filter's ability to remove particles of a certain size from a fluid. For example, a filter that is rated as a "10 micron" filter can capture particles as small as 10 micrometers. Higher rated filter may capture smaller particles. "Rating" may dictate the effectiveness of a filter. Minimum Efficiency Reporting Values (MERVs) can be used to indicate a filter's ability to capture particles. MERV is helpful in comparing the performance of different filters. Typically, the higher the MERV rating, the better the filter is at trapping specific types of particles, and the more efficient the filter. A higher rated filter typically has a higher efficiency, has smaller porosity in the filter to catch more particles in the air, has a higher MERV rating, can capture smaller particles, has a higher pressure drop (e.g., more fan horse-power is required to move the air through/into the spaces, and thus consuming more energy), and is more expensive than a lower rated filter. High-efficiency particulate air (HEPA), also known as high-efficiency particulate absorbing, is an efficiency standard of air filter. HEPA is a type of air filter that may remove at least 99.97% of dust, pollen, mold, bacteria, and/or any airborne particles with a size of at or about 0.3 microns (μm). The diameter specification of at or about 0.3 microns responds to severe cases; the most penetrating particle size (MPPS). HEPA filter is considered as one of the higher rated filters used in the HVACR system.

As defined herein, the term "damper" may refer to a plate-shaped device which opens or close to regulate the amount of air that passes through the duct and vents. Making adjustments on the damper may affect the indoor temperature by pushing cold or hot air into some areas or sections of the building. By adjusting the damper, the amount of air entering the building space via a duct can be reduced or increased.

As defined herein, the term "upstream" and "downstream" may refer to a relative location with respect to a direction of airflow. For example, when the airflow passes a component A before passes a component B, A is disposed upstream of B, and B is disposed downstream of A with respect to the airflow. As defined herein, the term "active airflow path" may refer to e.g., a path of the airflow (e.g., a conditioned airflow) that is delivered to a desired building or occupied space via a duct in the HVACR system.

Particular embodiments of the present disclosure are described herein with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

FIG. 1 is a schematic diagram of a refrigerant circuit 100, according to an embodiment. The refrigerant circuit 100 generally includes a compressor 120, a condenser 140, an expansion device 160, and an evaporator 180. The refrigerant circuit 100 may also include a controller (see 145 of FIG. 2) configured to control the operations of the compressor 120, the condenser 140, the expansion device 160, and/or the evaporator 180. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any suitable type of expander used in the field for expanding a working fluid to cause the working fluid to decrease in pressure and temperature. The refrigerant circuit 100 is an example and can be modified to include additional components. For example, in an embodiment, the refrigerant circuit 100 can include other components such as, but not limited to, an economizer heat exchanger, one or more flow control devices, a receiver tank, a dryer, a suction-liquid heat exchanger, or the like.

The refrigerant circuit 100 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like. In an embodiment, a HVACR system can be a rooftop unit or a heat pump air-conditioning unit.

The compressor 120, condenser 140, expansion device 160, and evaporator 180 are fluidly connected. In an embodiment, the refrigerant circuit 100 can be configured to be a cooling system (e.g., an air conditioning system) capable of operating in a cooling mode. In an embodiment, the refrigerant circuit 100 can be configured to be a heat pump system that can operate in both a cooling mode and a heating/defrost mode.

The refrigerant circuit 100 can operate according to generally known principles. The refrigerant circuit 100 can be configured to heat and/or cool a liquid process fluid (e.g., a heat transfer fluid or medium (e.g., a liquid such as, but not limited to, water or the like)), in which case the refrigerant circuit 100 may be generally representative of a liquid chiller system. The refrigerant circuit 100 can alternatively be configured to heat and/or cool a gaseous process fluid (e.g., a heat transfer medium or fluid (e.g., a gas such as, but not limited to, air or the like)), in which case the refrigerant circuit 100 may be generally representative of an air conditioner and/or heat pump.

In operation, the compressor 120 compresses a working fluid (e.g., a heat transfer fluid (e.g., refrigerant or the like)) from a relatively lower pressure gas to a relatively higher-pressure gas. The relatively higher-pressure gas is also at a relatively higher temperature, which is discharged from the compressor 120 and flows through the condenser 140. In accordance with generally known principles, the working fluid flows through the condenser 140 and rejects heat to the process fluid (e.g., water, air, etc.), thereby cooling the working fluid. The cooled working fluid, which is now in a liquid form, flows to the expansion device 160. The expansion device 160 reduces the pressure of the working fluid. As a result, a portion of the working fluid is converted to a gaseous form. The working fluid, which is now in a mixed liquid and gaseous form flows to the evaporator 180. The working fluid flows through the evaporator 180 and absorbs heat from the process fluid (e.g., a heat transfer medium (e.g., water, air, etc.)), heating the working fluid, and converting it to a gaseous form. The gaseous working fluid then returns to the compressor 120. The above-described process continues while the heat transfer circuit is operating, for example, in a cooling mode (e.g., while the compressor 120 is enabled).

Figure 2:
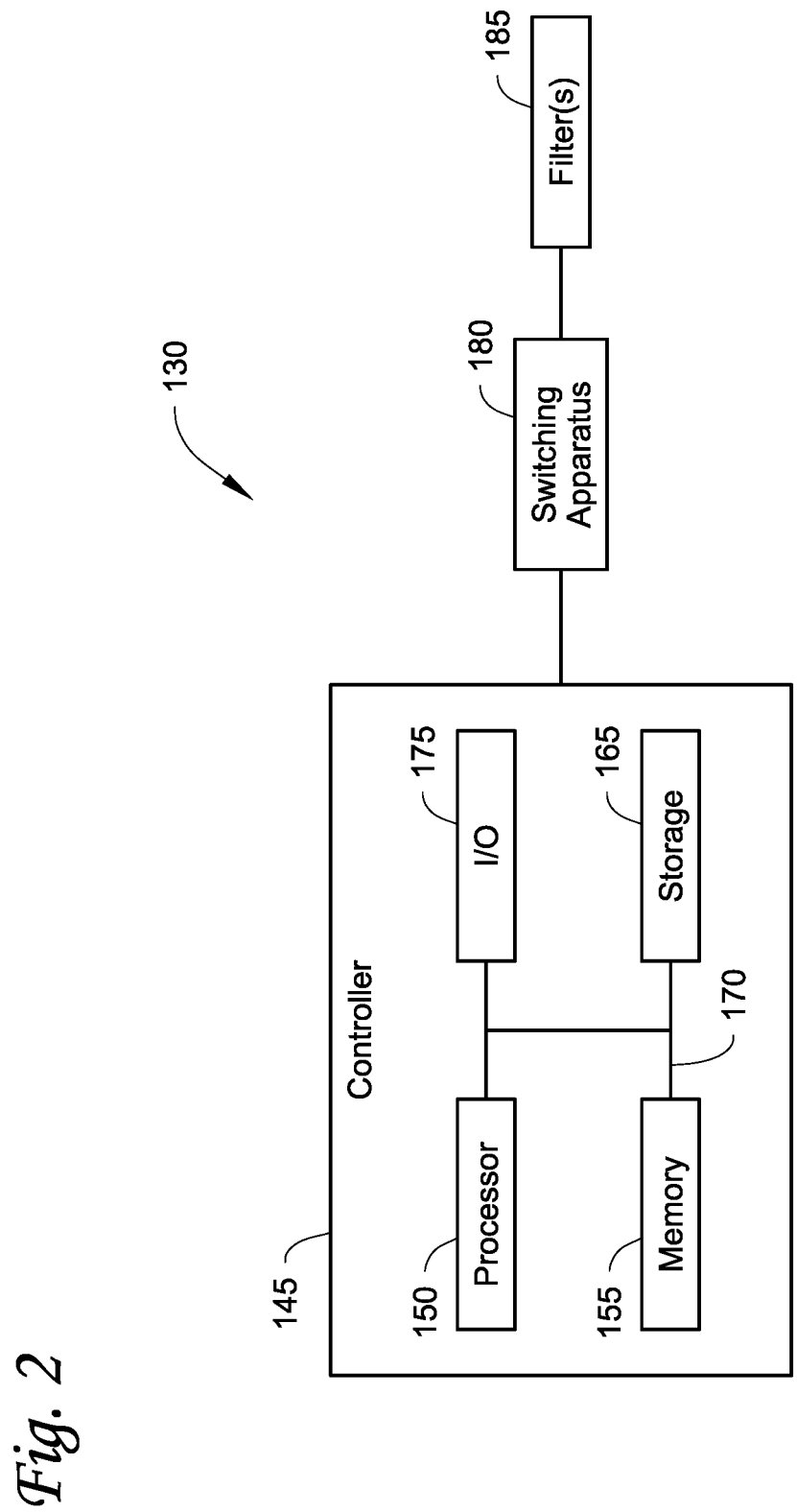
FIG. 2 illustrates a schematic diagram of a control system, according to an embodiment.

FIG. 2 illustrates a schematic diagram of a control system 130, according to an embodiment. The control system 130 includes a controller 145 configured to control a switching apparatus 180. The switching apparatus 180 is configured to switch the filter(s) 185 e.g., into or out of an active airflow path, and/or to move or rotate the filter(s) 185 in a predetermined direction. The switching apparatus 180 and the filter(s) 185 are described in detail in FIGS. 4-13.

The controller 145 is generally representative of hardware aspects of a controller for the refrigerant circuit 100 (FIG. 1). The controller 145 is an example and is not intended to be limiting. The controller 145 includes a processor 150, a memory 155, input/output 160, and storage 165. It is to be appreciated that the controller 145 can include one or more additional components.

The processor 150 can retrieve and execute programming instructions stored in the memory 155 and/or the storage 165. The processor 150 can also store and retrieve application data residing in the memory 155. The processor 150 can be a single processor, multiple processors, co-processors, or a single processor having multiple processing cores. In some embodiments, the processor 150 can be a single-threaded processor. In some embodiments, the processor 150 can be a multi-threaded processor.

An interconnect 170 is used to transmit programming instructions and/or application data between the processor 150, the memory 155, the storage 165, and the input/output 160. The interconnect 170 can, for example, be one or more busses or the like.

The memory 155 is generally included to be representative of a random access memory such as, but not limited to, Static Random Access Memory (SRAM), Dynamic Random Access Memory (DRAM), Flash, suitable combinations thereof, or the like. In some embodiments, the memory 155 can be a volatile memory. In some embodiments, the memory 155 can be a non-volatile memory.

The input/output 160 can include both wired and wireless connections. In an embodiment, the input/output 160 can transmit data and/or control signals via a wire line, an optical fiber cable, or the like.

Aspects described herein can be embodied as a system, method, or computer readable medium. In an embodiment, the aspects described can be implemented in hardware, software (including firmware or the like), or combinations thereof. Some aspects can be implemented in a computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Figure 3:
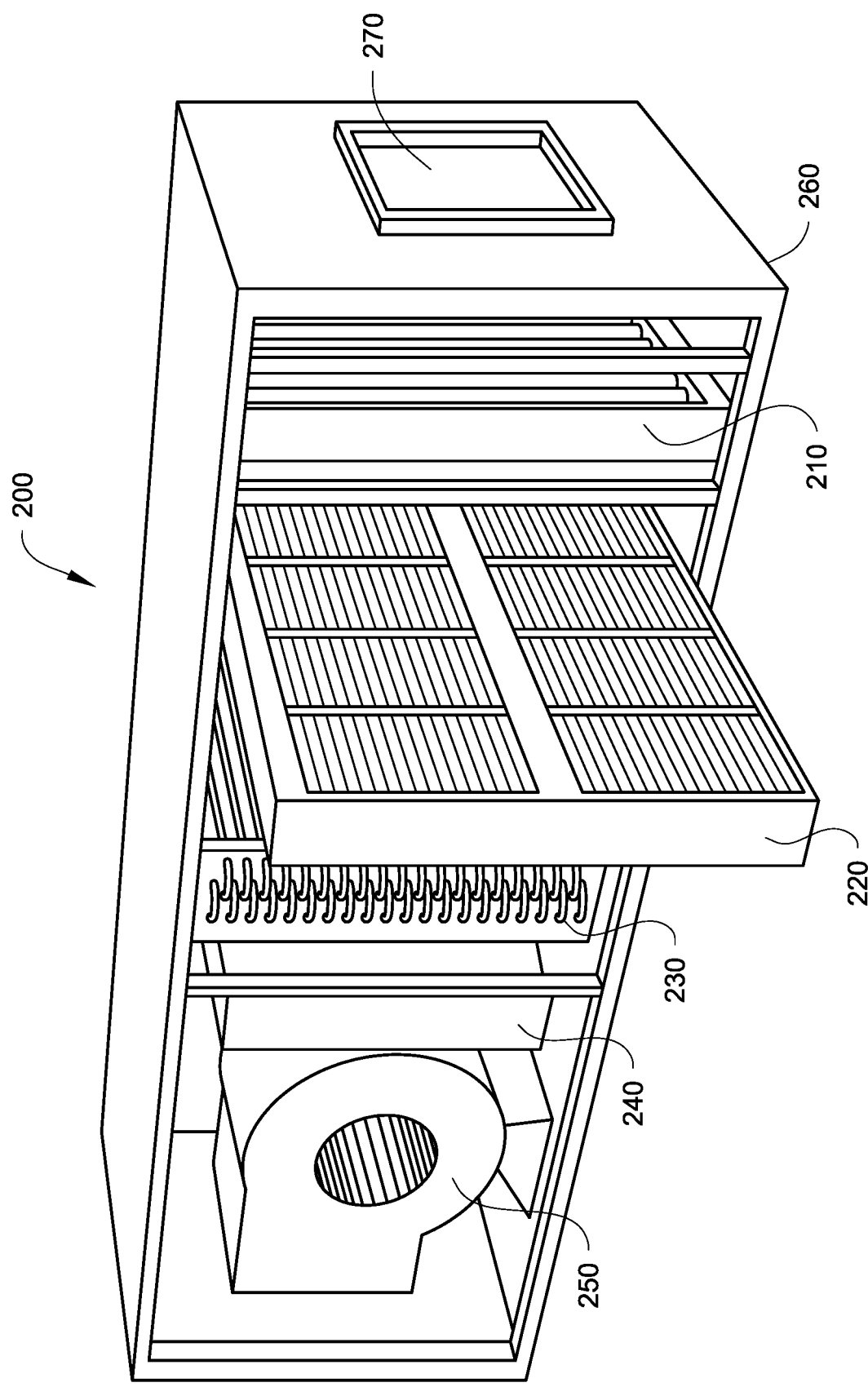
FIG. 3 illustrates a perspective view, partially cutaway, illustrating an air handling unit of an HVACR system, according to an embodiment.

FIG. 3 is a perspective view, partially cutaway, illustrating an air handling unit (air handler) 200 of an HVACR system, according to an embodiment.

The unit 200 includes an enclosure 260. In one embodiment, the enclosure 260 can be a generally rectangular cabinet having a first end wall defining an air inlet opening 270 (to allow air to flow into an internal space of the enclosure 260) and a second end wall defining an air outlet opening (not shown, to allow air to flow out of the enclosure 260 via an air outlet (that overlaps with the air outlet opening) of a fan 250). In FIG. 3, a side wall of the enclosure 260 is cutaway and the internal space of the enclosure 260 is shown.

The unit 200 also includes a primary filter 210 and a secondary filter 220. In one embodiment, the primary filter 210 and the secondary filter 220 can be one filter. It will be appreciated that the primary filter 210 and/or the secondary filter 220 can be a porous device configured to remove impurities or solid particles from air flow passed through the device.

The unit 200 further includes a component (e.g., a coil) 230. In one embodiment, the component 230 can be an air conditioning evaporator coil disposed in the flow path of air passing from the air inlet opening 270 to the air outlet opening of the enclosure 260 (which is also the air outlet of the fan 250). It will be appreciated that the component 230 can be different types in that the working fluid can be e.g., refrigerant, water, or the like. For example, when the working fluid is refrigerant, the component 230 can be an evaporator coil for cooling, and/or can be a condenser coil for heating. For example, when the working fluid is water, the component 230 can be tube(s) for chilled water to go through for cooling, and can be tube(s) for hot water to go through for heating.

In an embodiment, the unit 200 also includes a humidifier 240 configured to add moisture to the air to prevent dryness that can cause irritation in many parts of the human body or to increase humidity in the air.

Also the unit 200 includes a fan (or blower) 250. In one embodiment, the fan 250 can be a centrifugal fan having electric drive motor (not shown) to drive the fan 250 (e.g., to drive a shaft of the fan 250, to rotate the impeller of the fan 250, etc.). It will be appreciated that a centrifugal fan is a mechanical device for moving air or other gases toward the outlet of the fan in a direction at an angle (e.g., perpendicular) to the incoming air from the inlet of the fan. A centrifugal fan often contains a ducted housing to direct outgoing air in a specific direction or across a heat sink. The centrifugal fan can increase the speed and volume of an air stream with rotating impellers.

FIGS. 4-13 illustrate schematic diagrams of various switchable filtration systems, respectively, according to some embodiments. Each filtration system includes a switching apparatus (see 180 of FIG. 2). In an embodiment, the switching apparatus can be a damper, a valve, a gate, or any other suitable air diverter. In another embodiment, the switching apparatus can be an apparatus (e.g., an arm, a support bar, or any suitable mechanical hardware, parts, assembly, or machine with necessary motor and/or mechanism to move or rotate filters) that moves or rotates the filter(s) in a predetermined direction.

Figure 4:
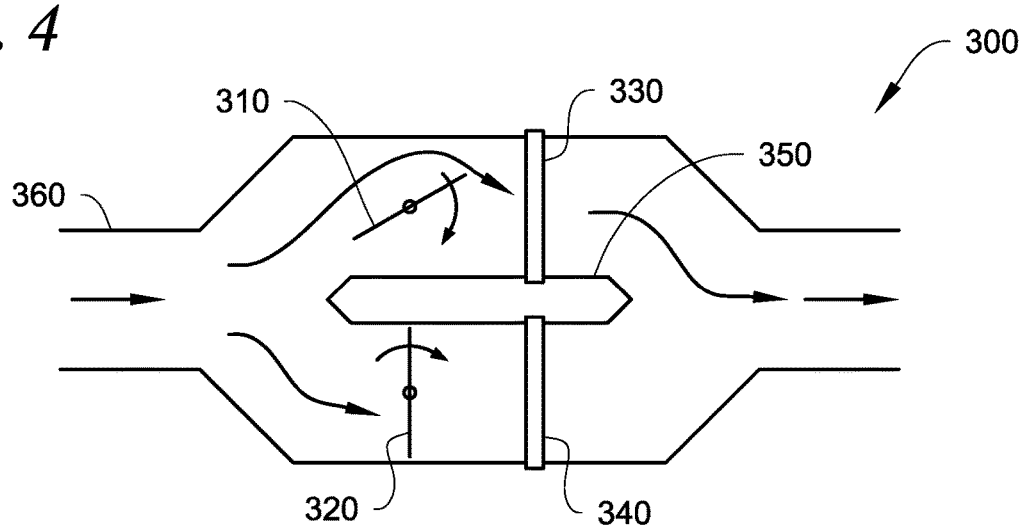
FIGS. 4-13 illustrate schematic diagrams of various switchable filtration systems, respectively, according to some embodiments.

FIG. 4 illustrates a schematic diagram of a switchable filtration system 300, according to an embodiment. The filtration system 300 includes a switching apparatus (310, 320), a first filter 330, a second filter 340, a separator 350, a duct 360, and a controller (e.g., 145 of FIG. 2). In an embodiment, the switching apparatus (310, 320) can include a first damper 310 disposed upstream of the first filter 330, and a second damper 320 disposed upstream of the second filter 340.

In an embodiment, the separator 350 is disposed in the middle (or around the middle) of the duct 360 separating the duct 360 into two half spaces (upper half and lower half). The first damper 310 and/or the first filter 330 extends from a first side of the separator 350 to an upper inner wall of the duct 360. The second damper 320 and/or the second filter 330 extends from a second side of the separator 350 to a lower inner wall of the duct 360.

The airflow (see arrows) passes into the duct 360. The controller can control the switching apparatus (310, 320) to switch the filters (330, 340) into or out of the active airflow path based on an air quality score.

It will be appreciated that in FIGS. 4-13, an air quality score can be determined (e.g., by the controller) based on, e.g., one or more of indoor air quality, ambient air quality, occupancy, a pre-determined time-based schedule, measured pressure drop across one or more filters, and/or other parameters.

Indoor (or ambient) air quality can be determined by parameters sensed by various sensors in the filtration system. The sensors may include sensor(s) detecting one or more of the amount, concentration (e.g., mg/m$^3$), and/or levels of $CO_2$, Volatile Organic Compounds (VOC), Particulate Matter (PM), $NO_2$, $SO_2$, relative humidity, levels of viruses or microbiologicals or pathogens, or any other suitable sensors. The sensed/detected parameters (data) can be sent to the controller. The air quality score can be determined, by the controller, based on the sensed indoor parameters.

For example, when the determined air quality score exceeds a predetermined threshold (indicating that the air quality is good enough, e.g., PM2.5, PM10, or similar sensed data go below a preset threshold), the controller can select (or control the switching apparatus to switch) a lower rated, low efficiency, and/or low pressure drop filter into the active airflow path to reduce energy consumption when a "better" filter is not required. When the determined air quality score is at or below the predetermined threshold (indicating that the air quality is not good enough, e.g., PM2.5, PM10, or similar sensed data suggest that a higher rated, higher efficiency, and/or higher pressure drop filter is required), the controller can select (or control the switching apparatus to switch) an HEPA filter into the active airflow path.

Similarly, when the determined air quality score is at or below the predetermined threshold (indicating that the air quality is not good enough, e.g., TVOCs (the total concentration of multiple VOCs present simultaneously in the air), $NO_2$, or other pollutant(s) are detected in the space and exceeds a preset threshold), the controller can select (or control the switching apparatus to switch) an appropriate filter, such as for example an activated charcoal or similar filter into the active airflow path. When the determined air quality score exceeds a predetermined threshold (indicating that the air quality is good enough, e.g., those pollutant is no longer observed in the space above the preset threshold), the controller can select (or control the switching apparatus to switch) an appropriate filter for example of a lower rated, lower efficiency, lower cost, and/or lower pressure drop filter into the active airflow path.

It will be appreciated that the predetermined threshold can be programmable, or be determined based on e.g., building guidelines such as WELL (a performance-based standard for measuring, certifying, and monitoring features of the built environment that impact human health and wellbeing, through air, water, nourishment, light, fitness, comfort, and mind), Environmental Protection Agency (EPA), etc.

For ambient air quality, similarly, a filtration system for outside air can be deployed in a selective fashion based on sensed/measured or reported ambient air quality (directly onsite, or through an ambient air quality data service) data. The sensed/measured parameters (data) can be sent to the controller. The air quality score can be determined, by the controller, based on the sensed/measured ambient air quality data. When the determined air quality score is at or below a predetermined threshold (indicating that the ambient air quality is not good enough, e.g., PM2.5 is high (for example if there is an active forest fire affecting the air quality in the region), the controller can select (or control the switching apparatus to switch) a higher rated filter (to ensure filtration of PM2.5 before using to condition an interior space) into the active airflow path. When the determined air quality score exceeds a predetermined threshold (indicating that the air quality is good enough), the controller can select (or control the switching apparatus to switch) a lower rated, low efficiency, less expensive, and/or lower pressure drop filter into the active airflow path to reduce overall cost.

Occupancy data can be determined based on a variety of occupancy detection methods (e.g., $CO_2$ level, occupant counting (the number of occupants), etc.). The determined occupancy data can be sent to the controller. The air quality score can be determined, by the controller, based on the determined occupancy data. When the determined air quality score is at or below a predetermined threshold (indicating that the ambient air quality is not good enough, e.g., when a preset number of humans are present in the space), the controller can select (or control the switching apparatus to switch) a higher rated filter into the active airflow path. When the determined air quality score exceeds a predetermined threshold (indicating that the air quality is good enough, e.g., during night or weekend hours, or any other typically unoccupied time), the controller can select (or control the switching apparatus to switch) a lower rated, low efficiency, less expensive, and/or lower pressure drop filter into the active airflow path.

Similarly, an air quality score can be determined, by the controller, based on the time-based schedule in lieu of active measurements. The controller can select (or control the switching apparatus to switch) a filter based on time of day, day of week, etc. An air quality score can also be determined, by the controller, based on the outside air/dilution versus filtration (i.e. using filtration optimized to the current outside air/dilution controls).

It will be appreciated that to prevent frequent switching of the filter(s) into and out of the active airflow path, a first predetermined threshold and a second predetermined threshold that is lower than the first predetermined threshold can be used. When the determined air quality score exceeds the first predetermined threshold, the controller can select (or control the switching apparatus to switch) the higher rated filter out of the active airflow path and/or select (or control the switching apparatus to switch) the lower rated filter into the active airflow path. When the determined air quality score is at or below the second predetermined threshold, the controller can select (or control the switching apparatus to switch) the lower rated filter out of the active airflow path and/or select (or control the switching apparatus to switch) the higher rated filter into the active airflow path.

Referring back to FIG. 4, the airflow (see arrows) passes into the duct 360. In an embodiment, when the determined air quality score exceeds a predetermined threshold (i.e., the air quality is good enough), the controller controls the first damper 310 to block airflow to the first filter 330 (i.e., switching the first filter out of the active airflow path), and controls the second damper 320 to allow airflow to the second filter 340 (i.e., switching the second filter into the active airflow path). When the determined air quality score is at or below the predetermined threshold (i.e., the air quality is not good enough), the controller controls the first damper 310 to allow airflow to the first filter 330 (i.e., switching the first filter into the active airflow path), and controls the second damper 320 to block airflow to the second filter 340 (i.e., switching the second filter out of the active airflow path).

Figure 5:
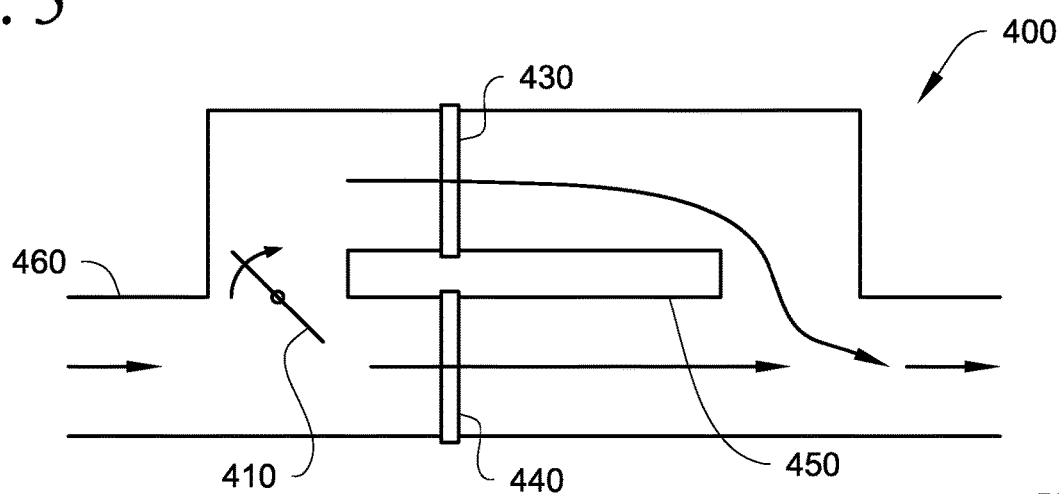

FIG. 5 illustrates a schematic diagram of a switchable filtration system 400, according to another embodiment. The filtration system 400 includes a switching apparatus (410), a first filter 430, a second filter 440, a separator 450, a duct 460, and a controller (e.g., 145 of FIG. 2). In an embodiment, the switching apparatus 410 is a damper disposed upstream of the first filter 430 and the second filter 440.

In an embodiment, the separator 450 is disposed in, at, or around the middle of the duct 460. The first filter 430 extends from a first side of the separator 450 to an upper inner wall of the duct 360. The second filter 440 extends from a second side of the separator 450 to a lower inner wall of the duct 460. The damper 410 extends from an end of the separator 450 to a side wall of the duct 460.

The controller can control the switching apparatus 410 to switch the filter 430 into or out of the active airflow path based on an air quality score.

The airflow (see arrows) passes into the duct 460. In an embodiment, the second filter 440 has a higher pressure drop or a higher efficiency, or is rated higher than the first filter 430. When the determined air quality score exceeds a predetermined threshold (i.e., the air quality is good enough), the controller controls the damper 410 to allow airflow to the first filter 430 (i.e., switching the first filter into the active airflow path). The second filter 440 is also in the active airflow path. That is, the active airflow path can include both the active airflow path the first filter 430 is in, and the active airflow path the second filter 440 is in. When the determined air quality score exceeds the predetermined threshold (i.e., the air quality is not good enough), the controller controls the damper 410 to block airflow to the first filter 430 (i.e., switching the first filter out of the active airflow path). In such embodiment, the second filter 440 is always in the active airflow path because when the damper 410 is closed, the air can be forced to go through the higher pressure drop filter 440 because of the duct design (more air would flow to the lower portion of the duct 460 since the air does not change direction in the lower portion of the duct 460). It will be appreciated that if the first filter 430 has a higher efficiency than the second filter 440, when the damper 410 is open, most air would still flow through the second filter 440 and would not get to the first filter 430.

Figure 6:
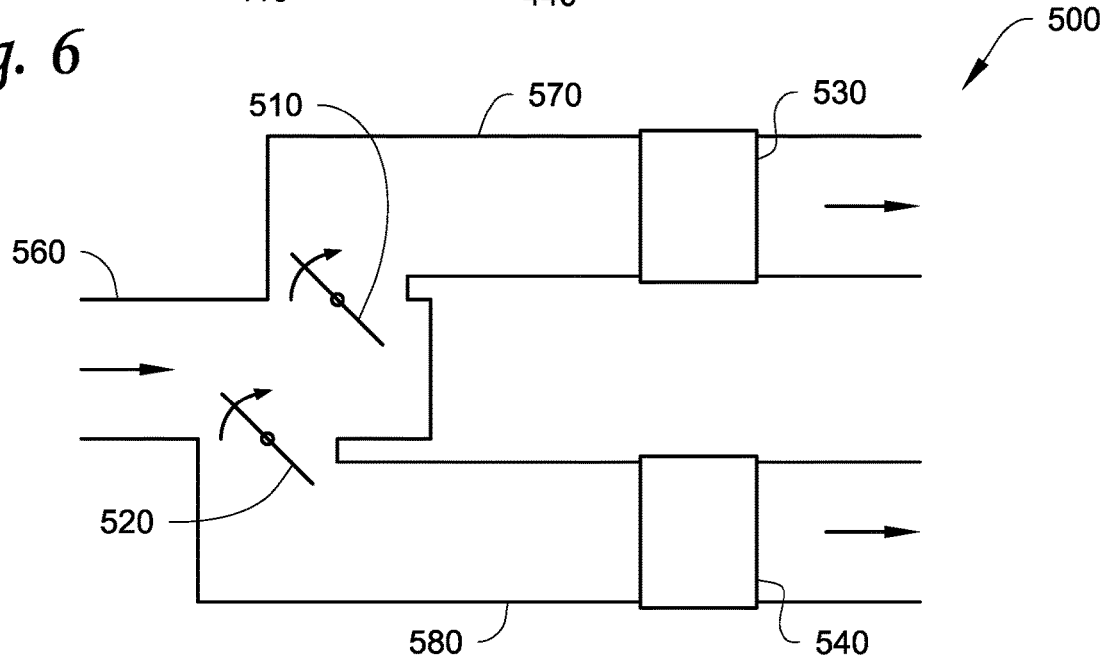

FIG. 6 illustrates a schematic diagram of a switchable filtration system 500, according to yet another embodiment. FIG. 6 is similar to FIG. 4, except that in FIG. 6, the first filter 530 is in a first air handler 570 and the second filter 540 is in a second air handler 580.

The filtration system 500 includes a switching apparatus (510, 520), a first filter 530, a second filter 540, a duct 360, and a controller (e.g., 145 of FIG. 2). In an embodiment, the switching apparatus (510, 520) can include a first damper 510 disposed upstream of the first filter 530, and a second damper 520 disposed upstream of the second filter 540.

The first damper 310 is disposed at and is configured to cover/block an opening of the first air handler 570. The first filter 530 extends from an upper inner wall to a lower inner wall of the first air handler 570. The second damper 510 is disposed at and is configured to cover/block an opening of the second air handler 580. The second filter 540 extends from an upper inner wall to a lower inner wall of the second air handler 580.

The airflow (see arrows) passes into the duct 560. The controller can control the switching apparatus (510, 520) to switch the filters (530, 540) into or out of the active airflow path based on an air quality score.

In an embodiment, when the determined air quality score exceeds a predetermined threshold (i.e., the air quality is good enough), the controller controls the first damper 510 to block airflow to the first filter 530 (i.e., switching the first filter out of the active airflow path), and controls the second damper 520 to allow airflow to the second filter 540 (i.e., switching the second filter into the active airflow path). When the determined air quality score is at or below the predetermined threshold (i.e., the air quality is not good enough), the controller controls the first damper 510 to allow airflow to the first filter 530 (i.e., switching the first filter into the active airflow path), and controls the second damper 520 to block airflow to the second filter 540 (i.e., switching the second filter out of the active airflow path).

Figure 7:
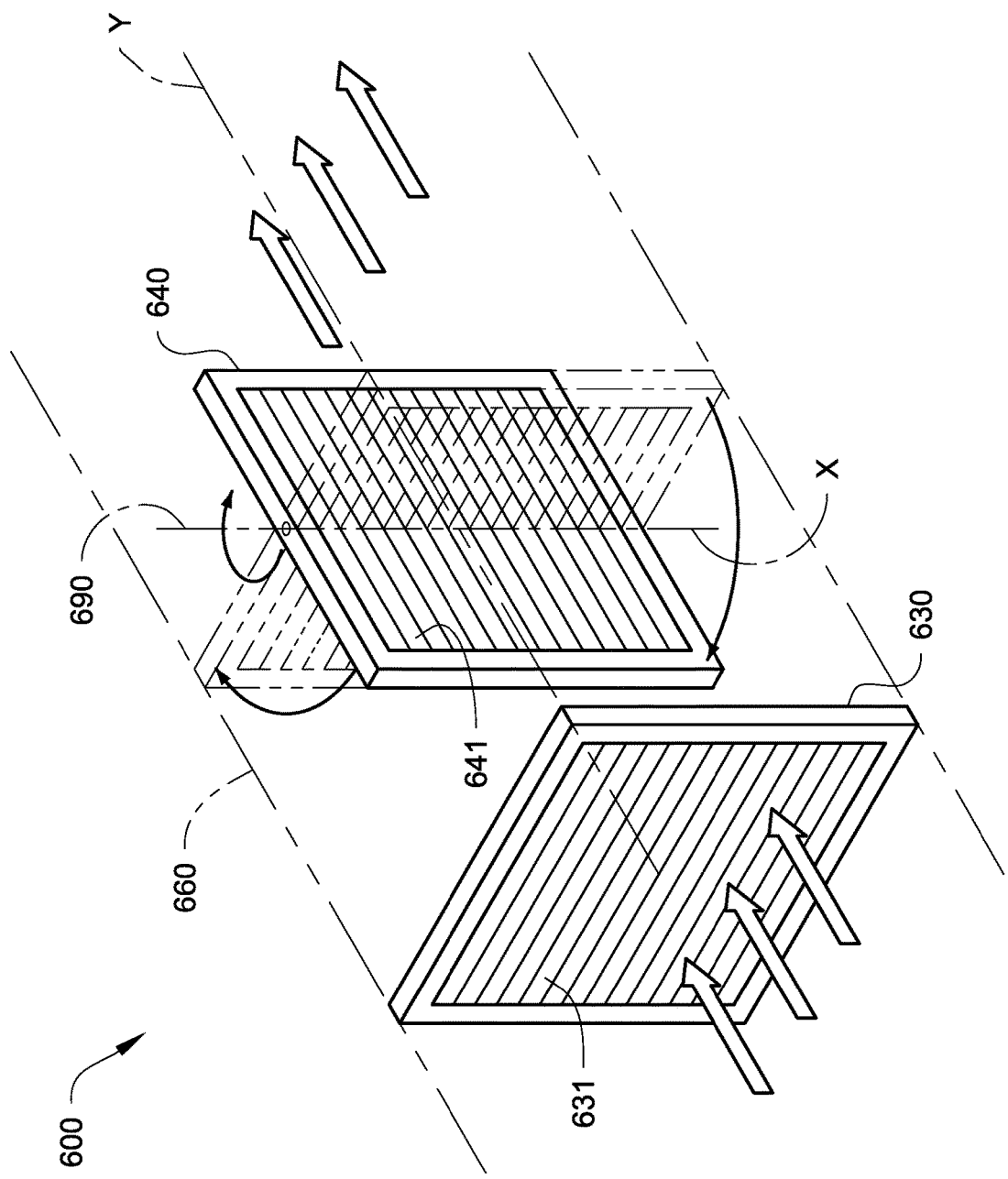

FIG. 7 illustrates a schematic diagram of a switchable filtration system 600, according to yet another embodiment.

The filtration system 600 includes a switching apparatus 690, a first filter 640, a second filter 630, a duct 660, and a controller (e.g., 145 of FIG. 2). The first filter 640 is disposed downstream of the second filter 630. In an embodiment, the first filter 640 can be disposed upstream of the second filter 630.

Each of the filters (630, 640) includes a main surface (631, 641) having a filtration material. The first filter 640 further includes a rotational axis that is substantially in parallel with the main surface 641. In an embodiment, the switching apparatus 690 can be e.g., an arm or a bar (or any suitable mechanical hardware, parts, assembly, or machine with necessary motor and/or mechanism to move or rotate filters) that is controlled by the controller (e.g., 145 of FIG. 2) along a rotational axis at around the middle of the first filter 640. In an embodiment, a first direction and a second direction can be perpendicular to each other and define the plane or the main surface 641 of the first filter 640. The first direction and the second direction are axes about which the first filter rotates. The first direction and the second direction can be anywhere between the edges of the first filter, other than in the center as described in the rest of the application. For example, the first direction can be at the vertical edge of the first filter and the second direction can be at the horizontal edge of the first filter. In another embodiment, the first direction can be at the horizontal edge of the first filter and the second direction can be at the vertical edge of the first filter. In an embodiment, the switching apparatus 690 extends in a vertical direction (X) that is substantially in parallel with the main surface 641. In another embodiment, the switching apparatus 690 extends in a horizontal direction (Y) that is substantially in parallel with the airflow (see block arrows).

The airflow (see block arrows) passes into the duct 660. The controller can control the switching apparatus 690 to switch the first filter 640 into or out of the active airflow path based on an air quality score.

In an embodiment, when the determined air quality score exceeds a predetermined threshold (i.e., the air quality is good enough), the controller controls the switching apparatus 690 to rotate the first filter 640 (see line arrows, i.e., switching the first filter out of the active airflow path) so that the main surface of the first filter 640 is substantially in parallel with a direction of the airflow. It will be appreciated that "switching the first filter out of the active airflow path" in this embodiment refers to a condition that the first filter 640 is still physically stay in the airflow path but the airflow does not flow through the filtration material. When the determined air quality score is at or below the predetermined threshold (i.e., the air quality is not good enough), the controller controls the switching apparatus 690 to rotate the first filter 640 (i.e., switching the first filter into the active airflow path) so that the main surface of the first filter 640 is substantially perpendicular to the direction of the airflow (and faces a cross-sectional area of the duct 660). In an embodiment, the main surface of the second filter 630 is always disposed substantially perpendicular to the direction of the airflow (i.e., in the active airflow path).

Figure 8:
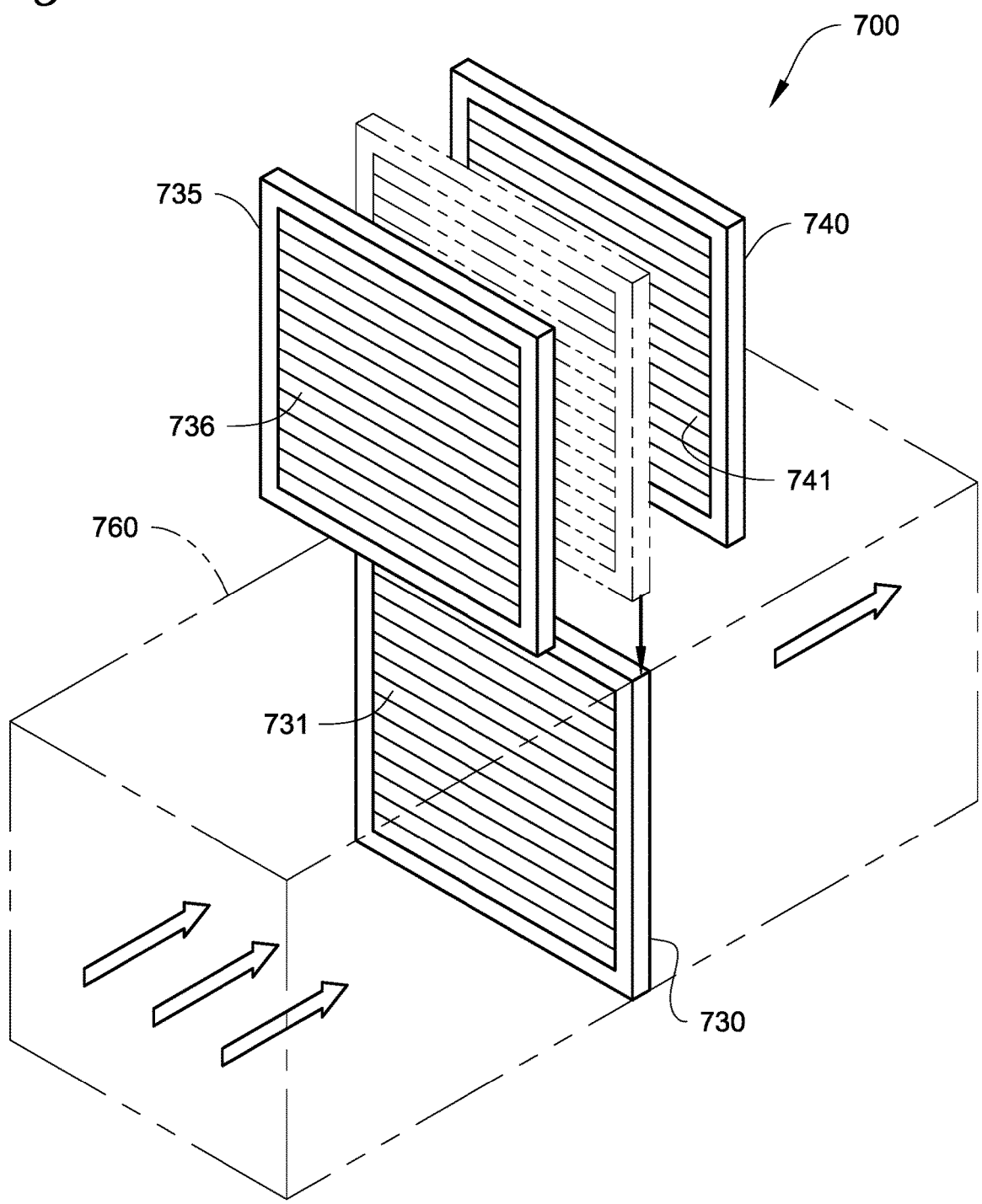

FIG. 8 illustrates a schematic diagram of a switchable filtration system 700, according to yet another embodiment.

The filtration system 700 includes a switching apparatus (see 180 of FIG. 2), a first filter 730, a second filter 740, a duct 760, and a controller (e.g., 145 of FIG. 2). The first filter 730 is disposed upstream of the second filter 740. In an embodiment, the first filter 730 can be disposed downstream of the second filter 740. In an embodiment, the filtration system 700 may include other filters 735.

Each of the filters (730, 735, 740) includes a main surface (731, 736, 741) having a filtration material. The switching apparatus (e.g., an arm, a bar, or any suitable mechanical hardware, parts, assembly, or machine with necessary motor and/or mechanism to move or rotate filters) can be configured to move the filters (730, 735, 740) into and out of an active airflow path in a direction substantially perpendicular to the direction of the airflow. FIG. 8 shows that the filter 730 is moved from a previous location (represented by the dotted lines) to the current location (by the switching apparatus controlled by a controller). The main surface (731, 736, 741) of each of the filters (730, 735, 740) is disposed in the direction substantially perpendicular to the direction of the airflow.

The airflow (see block arrows) passes into the duct 760. The controller can control the switching apparatus to switch the filters (730, 735, 740) into or out of the active airflow path based on an air quality score.

In an embodiment, when the determined air quality score exceeds a predetermined threshold (i.e., the air quality is good enough), the controller controls the switching apparatus to move the first filter 730 out of the active airflow path (so that no airflow flows through the first filter 730) in the direction substantially perpendicular to the direction of the airflow, and controls the switching apparatus to move the second filter 740 into the active airflow path in the direction substantially perpendicular to the direction of the airflow to face the airflow. When the determined air quality score is at or below the predetermined threshold (i.e., the air quality is not good enough), the controller controls the switching apparatus to move the first filter 730 into the active airflow path to face the airflow in the direction substantially perpendicular to the direction of the airflow, and controls the switching apparatus to move the second filter 740 out of the active airflow path in the direction substantially perpendicular to the direction of the airflow (so that no airflow flows through the first filter 730).

Figure 9:
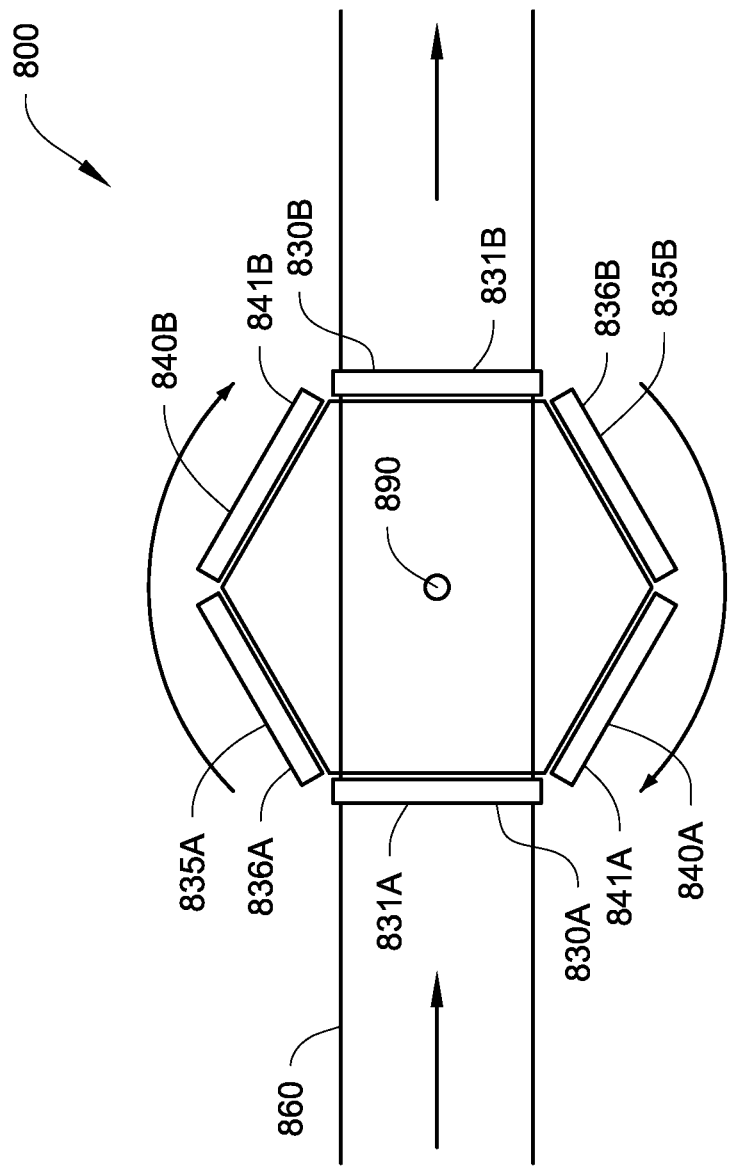

FIG. 9 illustrates a schematic diagram of a top view of a switchable filtration system 800, according to yet another embodiment.

The filtration system 800 includes a first set of filters (830A, 830B), a second set of filters (840A, 840B), a duct 860, and a controller (e.g., 145 of FIG. 2). In an embodiment, the filtration system 800 may include other set(s) of filters (835A, 835B). The filtration system 800 also includes a switching apparatus. In an embodiment, the switching apparatus can be a carousel (e.g., having a hexagon shape) rotatable around a rotational axis 890 (at or around the middle of the carousel that is substantially perpendicular to a direction of the active airflow path). The first set of filters (830A, 830B) are disposed at opposite sides (e.g., with main surfaces facing each other) of the carousel, respectively. The second set of filters (840A, 840B) are disposed at opposite sides (e.g., with main surfaces facing each other) of the carousel (adjacent to the first set of filters 830A, 830B), respectively. The other set of filters (835A, 835B) are disposed at opposite sides (e.g., with main surfaces facing each other) of the carousel (adjacent to the first set of filters 830A, 830B and the second set of filters 840A, 840B), respectively.

Each of the filters (830A, 830B, 835A, 835B, 840A, 840B) includes a main surface (831A, 831B, 836A, 836B, 841A, 841B) having a filtration material. The switching apparatus can be configured to move the filters (830A, 830B, 835A, 835B, 840A, 840B) into and out of an active airflow path by rotating around the axis 890. The main surface (831A, 831B, 836A, 836B, 841A, 841B) of each of the filters (830A, 830B, 835A, 835B, 840A, 840B) is disposed in the direction substantially perpendicular to the direction of the airflow when the corresponding filter is rotated into the active airflow path. In an embodiment, the switching apparatus may include a frame having a hexagon shape (six sides), each side of the frame supporting a filter, and each side of the frame connected to an arm or a bar (or any suitable mechanical hardware, parts, assembly, or machine with necessary motor and/or mechanism to move or rotate filters) the axis 890. The switching apparatus can be configured to move the filters (830A, 830B, 835A, 835B, 840A, 840B) into and out of the active airflow path by rotating the arm or the bar (or any suitable mechanical hardware, parts, assembly, or machine with necessary motor and/or mechanism to move or rotate filters) around the axis 890.

The airflow (see arrows) passes into the duct 860. The controller can control the switching apparatus to switch the filters (830A, 830B, 835A, 835B, 840A, 840B) into or out of the active airflow path based on an air quality score.

In an embodiment, when the determined air quality score exceeds a predetermined threshold (i.e., the air quality is good enough), the controller controls the switching apparatus to rotate the first set of filters (830A, 830B) out of the active airflow path (so that no airflow flows through the first set of filters), and controls the switching apparatus to rotate the second set of filters (840A, 840B) into the active airflow path to face the airflow. When the determined air quality score is at or below the predetermined threshold (i.e., the air quality is not good enough), the controller controls the switching apparatus to rotate the first set of filters (830A, 830B) into the active airflow path to face the airflow, and controls the switching apparatus to rotate the second set of filters (840A, 840B) out of the active airflow path (so that no airflow flows through the second set of filters).

Figure 10:
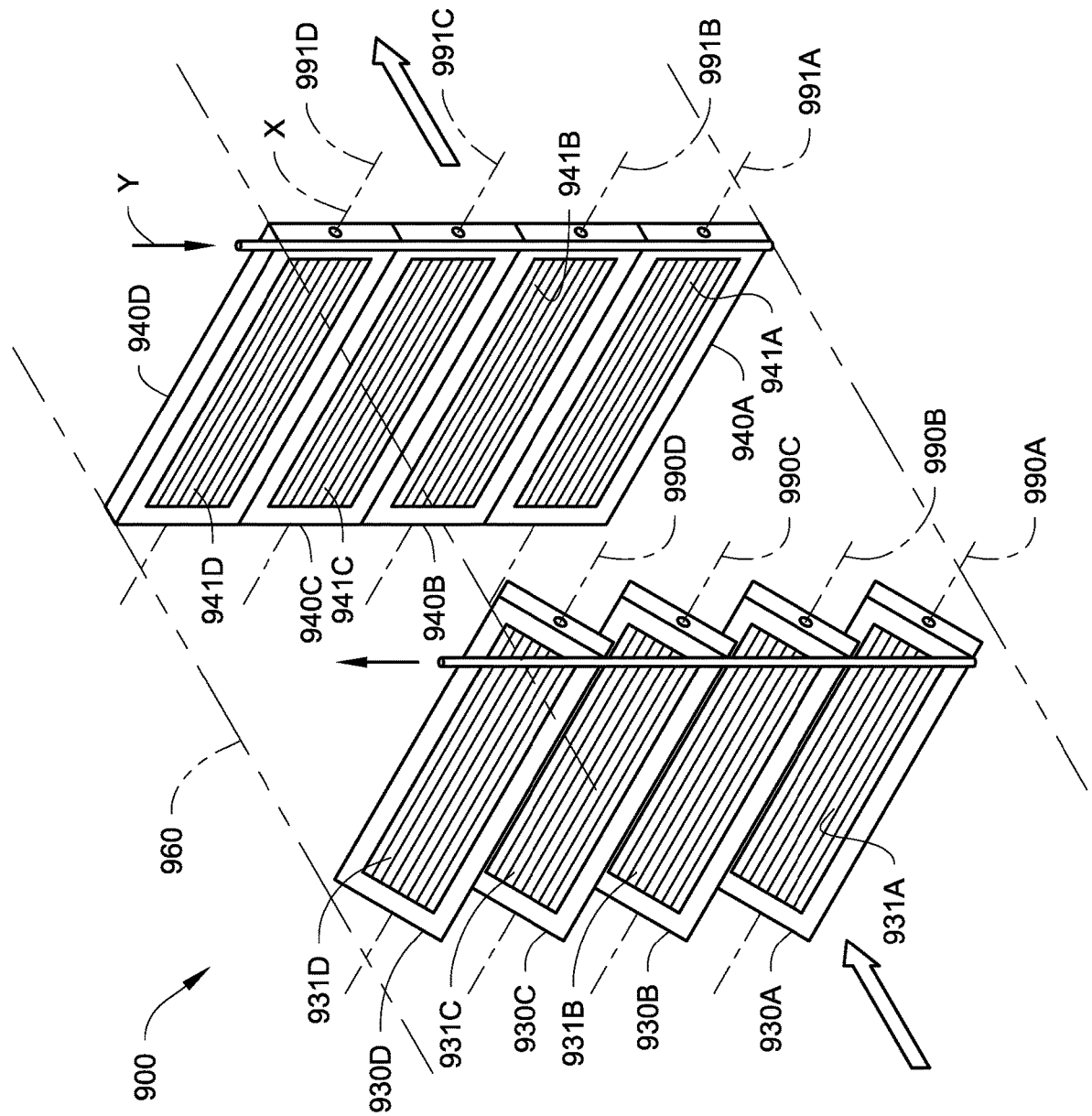

FIG. 10 illustrates a schematic diagram of a switchable filtration system 900, according to yet another embodiment.

The filtration system 900 includes a switching apparatus (990A-990D, 991A-991D), a first set of filters (930A-930D), a second set of filters (940A-940D), a duct 960, and a controller (e.g., 145 of FIG. 2). The first set of filters (930A-930D) are disposed upstream of the second set of filters (940A-940D). In an embodiment, the first set of filters (930A-930D) can be disposed downstream of the second set of filters (940A-940D).

Each of the filters (930A-930D, 940A-940D) includes a main surface (931A-931D, 941A-941D) having a filtration material. Each of the first filters includes a switching apparatus (990A-990D, 991A-991D) that is substantially in parallel with the main surface (931A-931D, 941A-941D). In an embodiment, the switching apparatus (990A-990D, 991A-991D) can be an arm or a bar (or any suitable mechanical hardware, parts, assembly, or machine with necessary motor and/or mechanism to move or rotate filters) along a rotational axis at around the middle of the filters. In an embodiment, the switching apparatus (990A-990D, 991A-991D) extends in a horizontal direction (X) that is substantially in parallel with the main surface (931A-931D, 941A-941D). In another embodiment, the switching apparatus extends in a vertical direction (Y) that is substantially perpendicular to X.

The airflow (see block arrows) passes into the duct 960. The controller can control the switching apparatus (990A-990D, 991A-991D) to switch the filters (930A-930D, 940A-940D) into or out of the active airflow path based on an air quality score.

In an embodiment, when the determined air quality score exceeds a predetermined threshold (i.e., the air quality is good enough), the controller controls the rotational axis (990A-990D) to rotate the first set of filters (930A-930D) (i.e., switching the first set of filters out of the active airflow path) so that the main surfaces of the first set of filters (930A-930D) are substantially in parallel with a direction of the airflow, and controls the rotational axis (991A-991D) to rotate the second set of filters (940A-940D) (i.e., switching the second set of filters into the active airflow path) so that the main surfaces of the second set of filters (940A-940D) are substantially perpendicular to the direction of the airflow (and facing a cross-sectional area of the duct 960). When the determined air quality score is at or below the predetermined threshold (i.e., the air quality is not good enough), the controller controls the rotational axis (990A-990D) to rotate the first set of filters (930A-930D) (i.e., switching the first set of filters into the active airflow path) so that the main surfaces of the first set of filters (930A-930D) are substantially perpendicular to the direction of the airflow (and facing a cross-sectional area of the duct 960), and controls the rotational axis (991A-991D) to rotate the second set of filters (940A-940D) (i.e., switching the second set of filters out of the active airflow path) so that the main surfaces of the second set of filters (940A-940D) are substantially in parallel with the direction of the airflow.

Figure 11:
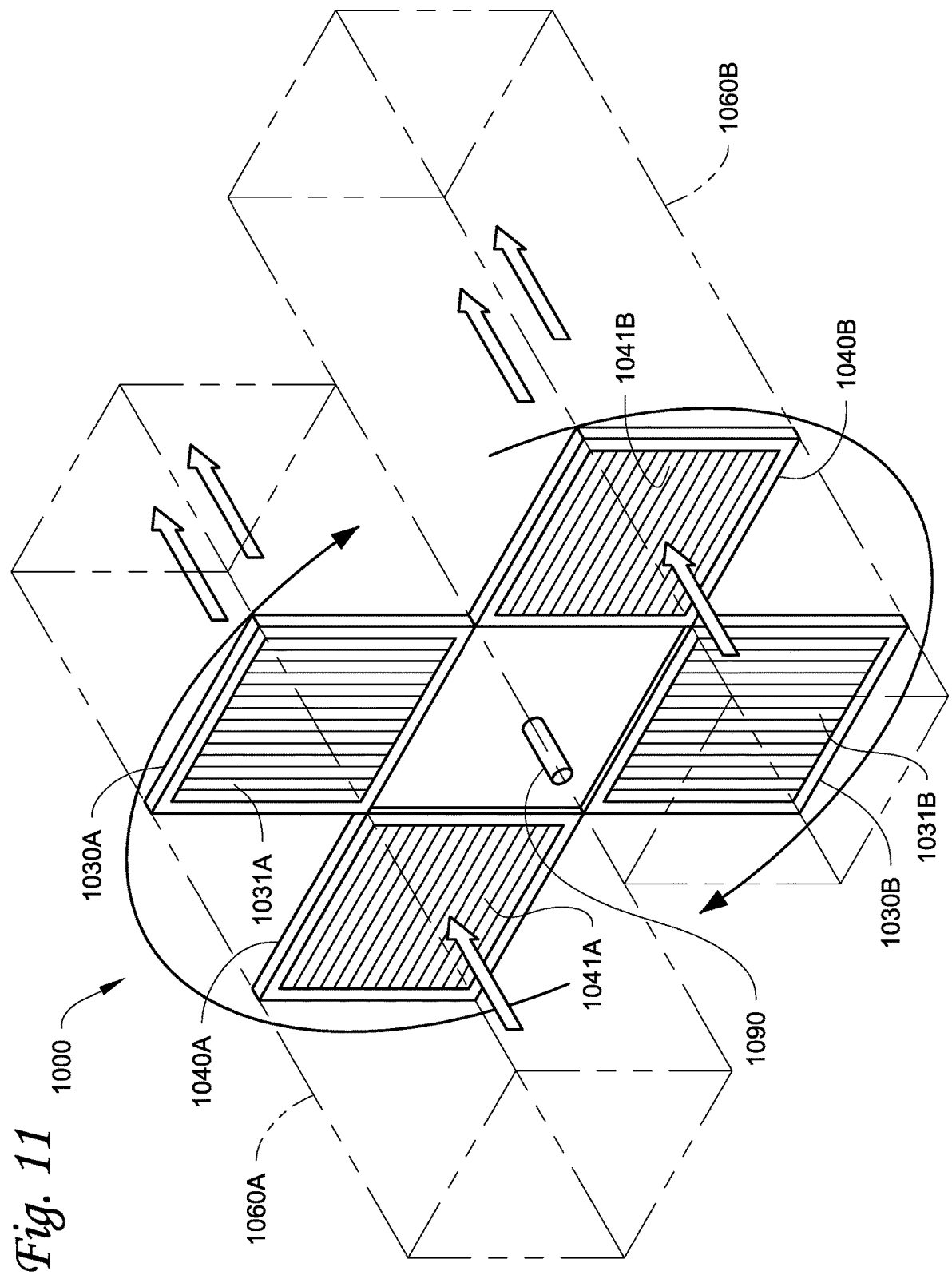

FIG. 11 illustrates a schematic diagram of a switchable filtration system 1000, according to yet another embodiment.

The filtration system 1000 includes a first set of filters (1030A, 1030B), a second set of filters (1040A, 1040B), a duct 1060A, and a controller (e.g., 145 of FIG. 2). In an embodiment, the filtration system 1000 may include another duct 1060B. The filtration system 1000 also includes a switching apparatus. In an embodiment, the switching apparatus can be a wheel (e.g., a desiccant wheel) rotatable around a rotational axis 1090 (at or around the middle of the wheel that is substantially in parallel with a direction of the active airflow path). In an embodiment, the switching apparatus may include a frame having a cross shape (four sides), each side of the frame supporting a filter, and each side of the frame connected to an arm or a bar (or any suitable mechanical hardware, parts, assembly, or machine with necessary motor and/or mechanism to move or rotate filters) along the axis 1090. The switching apparatus can be configured to move the filters (1030A, 1030B, 1040A, 1040B) into and out of the active airflow path by rotating the arm or the bar (or any suitable mechanical hardware, parts, assembly, or machine with necessary motor and/or mechanism to move or rotate filters) around the axis 1090. The first set of filters (1030A, 1030B) are disposed at opposite sides (e.g., with main surfaces aligning with and in parallel with each other) of the wheel, respectively. The second set of filters (1040A, 1040B) are disposed at opposite sides (e.g., with main surfaces aligning with and in parallel with each other) of the wheel (adjacent to the first set of filters 1030A, 1030B), respectively.

Each of the filters (1030A, 1030B, 1040A, 1040B) includes a main surface (1031A, 1031B, 1041A, 1041B) having a filtration material. The switching apparatus can be configured to move the filters (1030A, 1030B, 1040A, 1040B) into and out of an active airflow path by rotating around the axis 1090. The main surface (1031A, 1031B, 1041A, 1041B) of each of the filters (1030A, 1030B, 1040A, 1040B) is disposed in the direction substantially perpendicular to the direction of the airflow when the corresponding filter is rotated into or out of the active airflow path.

The airflow (see arrows) passes into the ducts (1060A, 1060B). The controller can control the switching apparatus to switch the filters (1030A, 1030B, 1040A, 1040B) into or out of the active airflow path based on an air quality score.

In an embodiment, when the determined air quality score exceeds a predetermined threshold (i.e., the air quality is good enough), the controller controls the switching apparatus to rotate the first set of filters (1030A, 1030B) out of the active airflow path (so that no airflow flows through the first set of filters) of the duct 1060A (or 1060B), and controls the switching apparatus to rotate the second set of filters (1040A, 1040B) into the active airflow path of the duct 1060A (or 1060B) to face the airflow. When the determined air quality score is at or below the predetermined threshold (i.e., the air quality is not good enough), the controller controls the switching apparatus to rotate the first set of filters (1030A, 1030B) into the active airflow path of the duct 1060A (or 1060B) to face the airflow, and controls the switching apparatus to rotate the second set of filters (1040A, 1040B) out of the active airflow path (so that no airflow flows through the second set of filters) of the duct 1060A (or 1060B).

Figure 12:
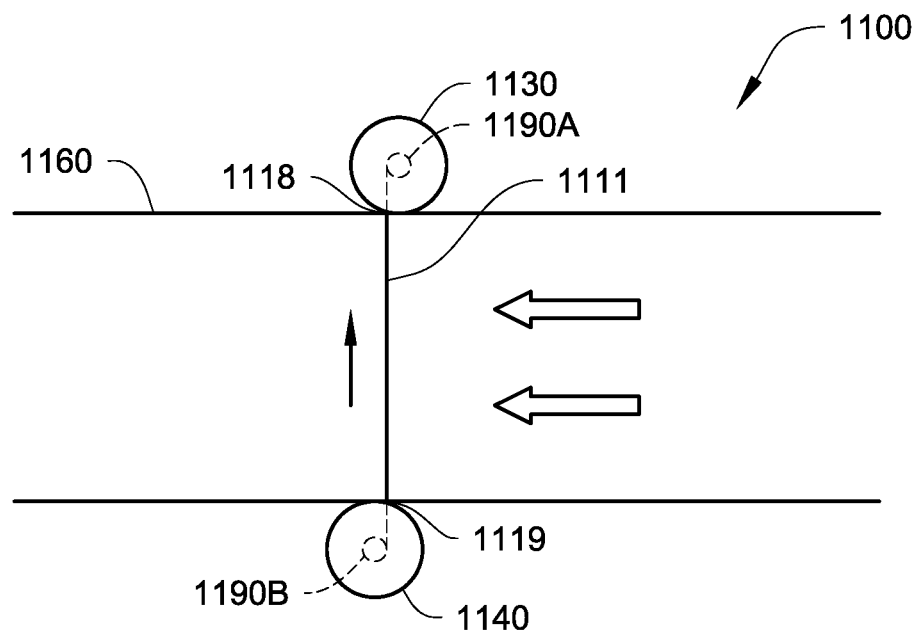

FIG. 12 illustrates a schematic diagram of a filtration system 1100, according to yet another embodiment.

The filtration system 1100 includes a film or filtration media (or material) 1111 configured in a form of a roll 1130, 1140 (or scroll). One or both ends of the roll include axis (1190A, 1190B) extending in a direction that is substantially in parallel with a width direction (into and out of the paper as shown in FIG. 12) of the media 1111. The roll includes an unused (clean) roll 1140 having a rolling axis 1190B and a used (contaminated) roll 1130 having a rolling axis 1190A.

The axis (1190A, 1190B) can be configured to e.g., unwind the clean roll 1140 to release clean media to expose to and face a cross-sectional area of the duct 1160, and rewind the contaminated roll 1130 to fold the contaminated media. Each roll (1130, 1140) can have multiple yards or more media in length.

The airflow (see block arrows) passes into the duct 1160. The duct 1160 can be the ducts of FIGS. 4-6 having a switching apparatus (e.g., a damper) disposed upstream of the media 1111 and configured to switch the media 1111 into or out of an active airflow. For example, when the determined air quality score exceeds a predetermined threshold, a controller (e.g., 145 of FIG. 2) controls the switching apparatus to block airflow to the media 1111. When the determined air quality score is at or below the predetermined threshold, the controller controls the switching apparatus to allow airflow to the media 1111.

It will be appreciated that the rolls (1130, 1140) can be disposed outside of the duct 1160 except the released/unwound media. As such, a sealing mechanism (at or near 1118, 1119) at where the media enters the duct 1160 (via openings at or near 1118, 1119 in the duct 1160 to allow the media to pass from/to the rolls) may be needed. The sealing mechanism can be an actuated sealing device against the media 1111 or rollers (1130, 1140) to seal the duct 1160 off.

It will also be appreciated that both rollers (1130, 1140) can be clean rolls. The roll 1130 can include a first filtration media (or film or material), the roll 1140 can include a second media. The first media can be a higher rated, higher efficiency, higher cost, and higher pressure drop media than the second media. In an embodiment, when the determined air quality score exceeds a predetermined threshold, the controller controls a switching apparatus (e.g., the axis 1190A, 1190B) to rewind the first media into the roll 1130 and to unwind the second media from the roll 1140 to cover airflow to the duct 1160. When the determined air quality score is at or below the predetermined threshold, the controller controls the switching apparatus (e.g., the axis 1190A, 1190B) to unwind the first media from the roll 1130 to cover the duct 1160 and to rewind the second media into the roll 1140.

Figure 13:
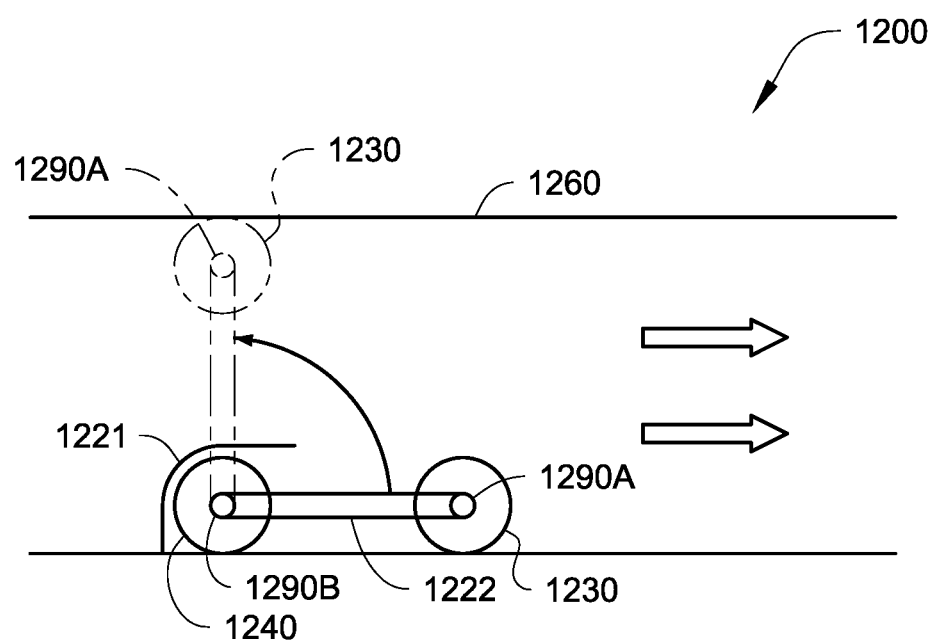

FIG. 13 illustrates a schematic diagram of a filtration system 1200, according to yet another embodiment. The filtration system 1200 can be the same (structure and/or function) as the filtration system 1100 of FIG. 12 except that (1) the rolls (1230, 1240) are disposed inside the duct 1260, that (2) an optional actuating arm 1222 is provided and configured to move the roll 1230, and that (3) optional guard(s) 1221 is/are provided and configured to prevent the unwound roll (1230, 1240) from exposure to the airflow.

The airflow (see block arrows) passes into the duct 1260. In an embodiment, when the determined air quality score exceeds a predetermined threshold, the controller (e.g., 145 of FIG. 2) controls the actuating arm 1222 to move the roll 1230 to a first position (a disengaged position) that is on a same side wall of the duct 1260 as the roll 1240 so that no airflow flows through the media between the rolls 1230 and 1240. The guard 1221 can direct the airflow around the rolls (1230, 1240) when the rolls are in the disengaged position. When the determined air quality score is at or below the predetermined threshold, the controller controls the actuating arm 1222 to move the roll 1230 to a second position (an engaged position) that is on an opposite side wall of the duct 1260 to the roll 1240 to allow airflow flows through the media between the rolls 1230 and 1240.

It will be appreciated that in operation, the contaminated roll can be processed or cleaned (e.g., using UV light on the contaminated media), or being placed for more than a predetermined period of time (e.g., 10 or more days) to get rid of pathogens (e.g., COVID-19) so that the rolls can be reused again. In another embodiment, the whole contaminated roll can be taken out and be replaced with a new clean roll. In an embodiment, a lower rated pre-filter that takes out bigger particles can be used in conjunction with the rolls (1130, 1140, 1230, 1240) with higher rated media. The media (material, filter, etc.) on the rolls may catch fine particles that the pre-filter cannot catch. Embodiments disclosed herein can reduce maintenance cost for replacement of filters. The entire roll can have the same higher rated material (e.g., material used for making face masks) that have capture qualities but have higher pressure drop.

In operation, the air quality score can be represented by one or more of parameters based on different operational modes. For example, for unoccupied (by residents such as humans, animals, plants, etc.) heat or cool, during unoccupied times, if a space or spaces (air quality score) exceed the unoccupied heating or cooling setpoints (threshold), the filtration system may operate using a lower efficiency (and/or lower pressure drop) filtering device unless conditions exist to use the higher efficiency filtering device. During occupied (by residents such as humans, animals, plants, etc.) times, the filtration system may operate using the higher efficiency (and/or higher pressure drop) filtering device when measured conditions (e.g., a contamination level) exceed a threshold for use of high efficiency filtration. During occupied times, the filtration system may operate using the lower efficiency (and/or lower pressure drop) filtering device when measured conditions (e.g., a contamination level) are below a threshold for use of higher efficiency filtration.

Other examples include pre-occupancy purge. Prior to occupancy, an optional pre-occupancy purge cycle can be initiated. While in the pre-occupancy purge, the filtration system may operate using the lower efficiency (and/or lower pressure drop) filtering device when measured conditions (e.g., a contamination level) are below the threshold for use of higher efficiency filtration. When measured conditions exceed the threshold for use of higher efficiency filtration, the higher efficiency (and/or high pressure drop) filtration device may be used. After occupancy, an optional post-occupancy purge cycle can be initiated. While in the post-occupancy purge, the filtration system may operate using the lower efficiency (and/or lower pressure drop) filtering device when measured conditions are below the threshold for use of higher efficiency filtration. When measured conditions exceed the threshold for use of higher efficiency filtration, the higher efficiency (and/or high pressure drop) filtration device may be used. When in morning warmup or morning cool down, the filtration system may follow the same control logic as pre-occupancy purge.

FIG. 14 illustrates a flowchart of a method 1400 for switching filters in a filtration system, according to an embodiment.

The flowchart 1400 may include one or more operations, actions, or functions depicted by one or more blocks 1410, 1420, 1430, 1440, and 1450. Although illustrated as discrete blocks, various blocks may be divided into additional blocks, combined into fewer blocks, or eliminated, depending on the desired implementation. In an embodiment, the method 1400 can be performed by the controller 145 of FIG. 2 or any other suitable controllers.

The flowchart 1400 may begin at block 1410. At 1410, the controller is configured to determine a filtration condition. In an embodiment, the filtration condition can be an air quality score. In another embodiment, the filtration condition can be space occupancy. In yet another embodiment, the filtration condition can be a measured condition during a scheduled pre-occupancy purge or post-occupancy purge for a space. In yet another embodiment, the filtration condition can be a measured condition during a scheduled warmup operation or cooldown operation for a space. Block 1410 may be followed by block 1420.

At 1420, the controller is configured to determine whether the filtration condition meets a predetermined expectation/condition/threshold. In an embodiment, the controller is configured to determine whether the air quality score or the measured condition exceeds (or at or below) a predetermined threshold. In another embodiment, the controller is configured to determine whether a space is occupied by residents. Block 1420 may be followed by block 1430 or block 1440.

At 1430, when the condition does not meet the predetermined expectation (e.g., the air quality score is at or below the predetermined threshold, or the measured condition indicates a need for a higher rated filter, or the space is occupied, etc.), the controller is configured to switch a higher rated filter into the active airflow path. Block 1430 may be followed by block 1450.

At 1440, when the condition meets the predetermined expectation (e.g., the air quality score exceeds the predetermined threshold, or the measured condition does not indicate a need for the higher rated filter, or the space is not occupied, etc.), the controller is configured to switch the higher rated filter out of the active airflow path. Block 1440 may be followed by block 1450.

At 1450, the controller is configured to operate the filtration system based on the filter configuration at 1430 or 1440.

It will be appreciated that in an embodiment, to avoid frequent switching the higher rated filter(s) into and out of the active airflow path, especially when e.g., the air quality score or the measured condition is close to the predetermined threshold, there can be a first threshold and a second threshold that is lower than the first threshold. In such embodiment, when the air quality score or the measured condition is at or below the second threshold, the controller is configured to switch a higher rated filter into the active airflow path. When the air quality score or the measured condition exceeds the first threshold, the controller is configured to switch the higher rated filter out of the active airflow path. When the air quality score or the measured condition is at or below the first threshold but exceeds the second threshold, the controller is configured to not switch filter(s) into or out of the active airflow path.

Embodiments disclosed herein can enable moving filtration material in and out of an airflow, or change of filter geometry (e.g., when a filter acts like a damper, with louvered panels that can close to create higher pressure drop and filter accordingly, or open to allow air to flow between the panels freely, thereby effectively taking the filter material out of use. A user interface, standalone or integrated into a building automation or other control system, can be provided to highlight filter selection, rationale for filter selection, enables filter resets, filter assignments, and/or control configuration to choose which filter is used, when, and why.

It will be appreciated that the filtration system can include standalone/in-room filters, return air filters, or filters for other locations in an airflow/environmental control system.

Embodiments disclosed herein provides a switchable filtration system that can manually or automatically divert air from one filter path to another, which includes a full or partial airflow selection, e.g., enabling partial flow through one filter with the remaining flow through one or more additional filters. Actuation can be achieved through dampers, gates, valves, or any other suitable means to control airflow velocity and pressure. Configurations of the filtration system include multipath (e.g., with separate damper control of airflow path across two or more filters), bypass (e.g., with one damper that opens to present a lower pressure drop filter, which causes airflow through that now-open bypass versus a higher pressure drop filter), or routing of return air or other airflows from one air handler with one type of filter or filters installed to another air handler with a different filter configuration. The filtration system may also be configured such that manual or automatic actuators move a filter in and out of an airflow, like a gate, a filter carousel, a rotating filter wheel (e.g., a desiccant wheel), or a rotating filter that moves a filter parallel to or perpendicular to an airflow. The filtration system may further be configured with a filter configured with louvered panels that can be opened or closed to activate or deactivate filter operation.

Aspects:

It is appreciated that any one of aspects 1-20, 21, 22, 23, and 24 can be combined with each other.

Aspect 1. A switchable filtration system for a heating, ventilation, air conditioning, and refrigeration (HVACR) system, the filtration system comprising:
a first filter;
a second filter;
a switching apparatus; and
a controller,
wherein the controller is configured to determine an air quality score,
wherein when the air quality score exceeds a predetermined threshold, the controller controls the switching apparatus to switch the first filter out of an active airflow path.

Aspect 2. The filtration system according to aspect 1, wherein the first filter has one or more of a higher pressure drop, a higher efficiency, and a higher rating than the second filter.

Aspect 3. The filtration system according to aspect 1 or aspect 2, wherein the switching apparatus includes a first damper disposed upstream of the first filter, and a second damper disposed upstream of the second filter,
wherein when the air quality score exceeds the predetermined threshold, the controller controls the first damper to block airflow to the first filter.

Aspect 4. The filtration system according to aspect 3, wherein when the air quality score exceeds the predetermined threshold, the controller controls the second damper to allow airflow to the second filter.

Aspect 5. The filtration system according to aspect 3 or aspect 4, wherein when the air quality score is at or below the predetermined threshold, the controller controls the first damper to allow airflow to the first filter.

Aspect 6. The filtration system according to any one of aspects 3-5, wherein when the air quality score is at or below the predetermined threshold, the controller controls the second damper to block airflow to the second filter.

Aspect 7. The filtration system according to any one of aspects 3-6, wherein the first filter is disposed in a first air handler, and the second filter is disposed in a second air handler.

Aspect 8. The filtration system according to any one of aspects 1-7, wherein the switching apparatus includes a damper disposed upstream of the first filter and the second filter, wherein when the air quality score exceeds the predetermined threshold, the controller controls the damper to block airflow to the first filter.

Aspect 9. The filtration system according to aspect 8, wherein when the air quality score is at or below the predetermined threshold, the controller controls the damper to allow airflow to the first filter.

Aspect 10. The filtration system according to any one of aspects 1-9, wherein the first filter includes a main surface having a filtration material, the first filter further includes a rotational axis, a first direction and a second direction being substantially parallel with the main surface, the first direction is substantially perpendicular to the second direction, wherein when the air quality score exceeds the predetermined threshold, the controller controls the switching apparatus to rotate the first filter so that the main surface is substantially in parallel with a direction of an airflow.

Aspect 11. The filtration system according to aspect 10, wherein when the air quality score exceeds the predetermined threshold, the controller controls the switching apparatus to rotate the first filter about the first direction.

Aspect 12. The filtration system according to aspect 10, wherein when the air quality score exceeds the predetermined threshold, the controller controls the switching apparatus to rotate the first filter about the second direction.

Aspect 13. The filtration system according to aspect 12, wherein the filtration system includes a plurality of first filters, wherein when the air quality score exceeds the predetermined threshold, the controller controls the switching apparatus to rotate the plurality of first filters about the second direction.

Aspect 14. The filtration system according to any one of aspects 10-13, wherein when the air quality score is at or below the predetermined threshold, the controller controls the switching apparatus to rotate the first filter so that the main surface is substantially perpendicular to the direction of the airflow.

Aspect 15. The filtration system according to aspect 14, wherein when the air quality score is at or below the predetermined threshold, the controller controls the switching apparatus to rotate the first filter about the first direction.

Aspect 16. The filtration system according to aspect 14, wherein when the air quality score is at or below the predetermined threshold, the controller controls the switching apparatus to rotate the first filter about the second direction.

Aspect 17. The filtration system according to any one of aspects 1-16, wherein the first filter includes a main surface having a filtration material, the main surface is substantially perpendicular to the active airflow path, wherein when the air quality score exceeds the predetermined threshold, the controller controls the switching apparatus to move the first filter out of the active airflow path in a direction substantially perpendicular to the active airflow path.

Aspect 18. The filtration system according to aspect 17, wherein when the air quality score is at or below the predetermined threshold, the controller controls the switching apparatus to move the first filter into the active airflow path in the direction substantially perpendicular to the active airflow path.

Aspect 19. The filtration system according to any one of aspects 1-18, wherein when the air quality score exceeds the predetermined threshold, the controller controls the switching apparatus to rotate the first filter out of the active airflow path and rotate the second filter into the active airflow path.

Aspect 20. The filtration system according to any one of aspects 1-19, wherein when the air quality score is at or below the predetermined threshold, the controller controls the switching apparatus to rotate the first filter into the active airflow path and rotate the second filter out of the active airflow path.

Aspect 21. A method for switching filters in a filtration system for a heating, ventilation, air conditioning, and refrigeration (HVACR) system, the filtration system including a first filter, a second filter, a switching apparatus, and a controller, the method comprising:
determining, by the controller, an air quality score; and
when the air quality score exceeds a predetermined threshold, controlling the switching apparatus to switch the first filter out of an active airflow path,
wherein the first filter has one or more of a higher pressure drop, a higher efficiency, and a higher rating than the second filter.

Aspect 22. A switchable filtration system for a heating, ventilation, air conditioning, and refrigeration (HVACR) system, the filtration system comprising:
a first filter;
a second filter;
a switching apparatus; and
a controller,
wherein the controller is configured to determine whether a space is occupied by residents,
wherein when the space is occupied, the controller controls the switching apparatus to switch the first filter into an active airflow path; and when the space is unoccupied, the controller controls the switching apparatus to switch the first filter out of the active airflow path.

Aspect 23. A switchable filtration system for a heating, ventilation, air conditioning, and refrigeration (HVACR) system, the filtration system comprising:
a first filter;
a second filter;
a switching apparatus; and
a controller,
wherein the controller is configured to determine whether a space is ready for a pre-occupancy purge or a post-occupancy purge based on a predetermined schedule,
wherein during the pre-occupancy purge or the post-occupancy purge, when a measured condition exceeds a predetermined threshold, the controller controls the switching apparatus to switch the first filter into an active airflow path; and when the measured condition is at or below the predetermined threshold, the controller controls the switching apparatus to switch the first filter out of the active airflow path.

Aspect 24. A switchable filtration system for a heating, ventilation, air conditioning, and refrigeration (HVACR) system, the filtration system comprising:
a first filter;
a second filter;
a switching apparatus; and
a controller,
wherein the controller is configured to determine whether a space is ready for a warmup operation or a cooldown operation based on a predetermined schedule,
wherein during the warmup operation or the cooldown operation, when a measured condition exceeds a predetermined threshold, the controller controls the switching apparatus to switch the first filter into an active airflow path; and when the measured condition is at or below the predetermined threshold, the controller controls the switching apparatus to switch the first filter out of the active airflow path.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A switchable filtration system for a heating, ventilation, air conditioning, and refrigeration (HVACR) system, the filtration system comprising:
    a first filter;
    a second filter;
    a switching apparatus; and
    a controller,
    wherein the controller is configured to determine an air quality score,
    wherein when the air quality score exceeds a first predetermined threshold, the controller controls the switching apparatus to switch the first filter out of an active airflow path,
    wherein when the air quality score is at or below a second predetermined threshold, the controller controls the switching apparatus to switch the first filter into the active airflow path.

2. The filtration system according to claim 1, wherein the first filter has one or more of a higher pressure drop, a higher efficiency, and a higher rating than the second filter.

3. The filtration system according to claim 1, wherein the switching apparatus includes a first damper disposed upstream of the first filter, and a second damper disposed upstream of the second filter,
    wherein when the air quality score exceeds the first predetermined threshold, the controller controls the first damper to block airflow to the first filter.

4. The filtration system according to claim 3, wherein when the air quality score exceeds the first predetermined threshold, the controller controls the second damper to allow airflow to the second filter, or
    wherein when the air quality score is at or below the second predetermined threshold, the controller controls the first damper to allow airflow to the first filter, or
    wherein when the air quality score is at or below the second predetermined threshold, the controller controls the second damper to block airflow to the second filter.

5. The filtration system according to claim 3, wherein the first filter is disposed in a first air handler, and the second filter is disposed in a second air handler.

6. The filtration system according to claim 1, wherein the switching apparatus includes a damper disposed upstream of the first filter and the second filter,
    wherein when the air quality score exceeds the first predetermined threshold, the controller controls the damper to block airflow to the first filter.

7. The filtration system according to claim 6, wherein when the air quality score is at or below the second predetermined threshold, the controller controls the damper to allow airflow to the first filter.

8. The filtration system according to claim 1, wherein the first filter includes a main surface having a filtration material, the first filter further includes a rotational axis, a first direction and a second direction being substantially parallel with the main surface, the first direction is substantially perpendicular to the second direction,
    wherein when the air quality score exceeds the first predetermined threshold, the controller controls the switching apparatus to rotate the first filter so that the main surface is substantially in parallel with a direction of an airflow.

9. The filtration system according to claim 8, wherein when the air quality score exceeds the first predetermined threshold, the controller controls the switching apparatus to rotate the first filter about the first direction.

10. The filtration system according to claim 8, wherein when the air quality score exceeds the first predetermined threshold, the controller controls the switching apparatus to rotate the first filter about the second direction.

11. The filtration system according to claim 10, wherein the filtration system includes a plurality of first filters,
    wherein when the air quality score exceeds the first predetermined threshold, the controller controls the switching apparatus to rotate the plurality of first filters about the second direction.

12. The filtration system according to claim 8, wherein when the air quality score is at or below the second predetermined threshold, the controller controls the switching apparatus to rotate the first filter so that the main surface is substantially perpendicular to the direction of the airflow.

13. The filtration system according to claim 12, wherein when the air quality score is at or below the second predetermined threshold, the controller controls the switching apparatus to rotate the first filter about the first direction.

14. The filtration system according to claim 12, wherein when the air quality score is at or below the second predetermined threshold, the controller controls the switching apparatus to rotate the first filter about the second direction.

15. The filtration system according to claim 1, wherein the first filter includes a main surface having a filtration material, the main surface is substantially perpendicular to the active airflow path,
    wherein when the air quality score exceeds the first predetermined threshold, the controller controls the switching apparatus to move the first filter out of the active airflow path in a direction substantially perpendicular to the active airflow path.

16. The filtration system according to claim 15, wherein when the air quality score is at or below the second predetermined threshold, the controller controls the switching apparatus to move the first filter into the active airflow path in the direction substantially perpendicular to the active airflow path.

17. The filtration system according to claim 1, wherein when the air quality score exceeds the first predetermined threshold, the controller controls the switching apparatus to rotate the first filter out of the active airflow path and rotate the second filter into the active airflow path; and
    when the air quality score is at or below the second predetermined threshold, the controller controls the switching apparatus to rotate the first filter into the active airflow path and rotate the second filter out of the active airflow path.

18. The filtration system according to claim 1, wherein when the air quality score is at or below the first predetermined threshold and exceeds the second predetermined threshold, the controller is configured to not switch the first filter or the second filter into or out of the active airflow path.

19. A switchable filtration system for a heating, ventilation, air conditioning, and refrigeration (HVACR) system, the filtration system comprising:
- a first filter;
- a second filter;
- a switching apparatus; and
- a controller,
- wherein the controller is configured to determine whether a space is ready for a pre-occupancy purge or a post-occupancy purge based on a first predetermined schedule,
- wherein during the pre-occupancy purge or the post-occupancy purge, when a first measured condition exceeds a first predetermined threshold, the controller controls the switching apparatus to switch the first filter into an active airflow path; and when the first measured condition is at or below the first predetermined threshold, the controller controls the switching apparatus to switch the first filter out of the active airflow path.

20. The switchable filtration system according to claim 19, wherein the controller is configured to determine whether the space is ready for a warmup operation or a cooldown operation based on a second predetermined schedule,
- wherein during the warmup operation or the cooldown operation, when a second measured condition exceeds a second predetermined threshold, the controller controls the switching apparatus to switch the first filter into the active airflow path; and when the second measured condition is at or below the second predetermined threshold, the controller controls the switching apparatus to switch the first filter out of the active airflow path.

* * * * *